United States Patent
Nishina et al.

(10) Patent No.: US 6,885,979 B2
(45) Date of Patent: Apr. 26, 2005

(54) DATA STORAGE APPARATUS

(75) Inventors: Masatoshi Nishina, Saitama-ken (JP); Hideki Machino, Saitama-ken (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/150,009

(22) Filed: May 20, 2002

(65) Prior Publication Data

US 2002/0188427 A1 Dec. 12, 2002

(30) Foreign Application Priority Data

Jun. 8, 2001 (JP) .................................. 2001-174013

(51) Int. Cl.$^7$ ................... G06F 15/00; G06F 17/40
(52) U.S. Cl. ........................................... 702/187
(58) Field of Search ........................... 702/79, 80, 176, 702/187, 189; 365/189.01, 220–222

(56) References Cited

U.S. PATENT DOCUMENTS 6,356,485 B1 * 3/2002 Proebsting ............. 365/189.01

FOREIGN PATENT DOCUMENTS

| JP | 4-348226 | 12/1992 |
| JP | 06-018293 | * 1/1994 |
| JP | 7-282830 | 10/1995 |
| JP | 8-29203 | 2/1996 |
| JP | 8-247799 | 9/1996 |

* cited by examiner

Primary Examiner—Michael Nghiem
(74) Attorney, Agent, or Firm—Arent Fox PLLC

(57) ABSTRACT

A data storage apparatus includes a sampling device for sampling data in a predetermined cycle, and a storage device for storing a plurality of items of the data sampled by said sampling device. The data storage apparatus also includes an updating device for updating the plurality of items of the data stored in said storage device to respective ones of the plurality of items of the data, which were sampled at later times than the plurality of items of the data were stored, in respective predetermined updating cycles which are shorter than the updating cycles of the plurality of items of the data which were sampled at respective earlier times.

12 Claims, 4 Drawing Sheets

F I G. 1
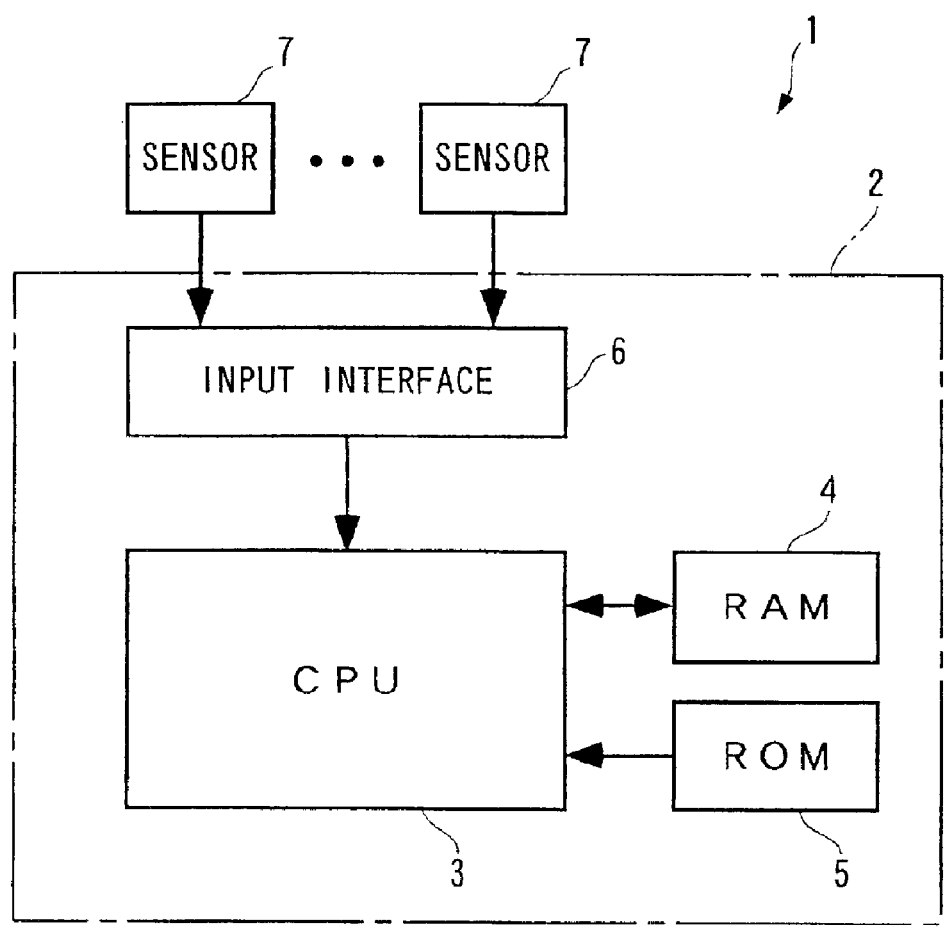

DATA STORAGE APPARATUS

BACKGROUND OF THE INVENTION

1. Field of the Invention

This invention relates to a data storage apparatus for storing data, such as measurement data input from the outside.

2. Description of the Prior Art

Conventionally, a data storage apparatus of this kind has been proposed e.g. by Japanese Laid-Open Patent Publication (Kokai) No. H06-18293. The data storage apparatus includes an A/D converter circuit, a CPU, a ring buffer memory, and recording means. In this data storage apparatus, a process for recording measurement data is executed as follows: First, the A/D converter circuit converts a measurement data item input from the outside to a digital measurement data item. Then, the digital measurement data item is temporarily stored in the ring buffer memory, and at the same time it is determined whether or not a trigger has been generated. If no trigger has been generated, it is determined whether or not the present measurement data item stored in the ring buffer memory is within a predetermined range of values thereof. If the present measurement data item is within the predetermined range, it is recorded in the recording means on condition that the present measurement data item is a fifth one input after recording of a measurement data item in the recording means was performed on a preceding occasion, but not recorded unless it is the fifth one.

On the other hand, if the present measurement data item stored in the ring buffer memory is not within the predetermined range, the trigger is generated, and at the same time two consecutive preceding measurement data items and the present one are recorded in the recording means. Once the trigger is generated, whenever a measurement data item is input, it is transferred from the ring buffer memory to the recording means and recorded therein. Thus, in the above recording processing, measurement data items are recorded in a thinned manner before generation of the trigger, and upon generation of the trigger, three consecutive measurement data items including the present one, which were input immediately before generation of the trigger, are recorded, followed by recording every measurement data item input thereafter.

When the above conventional data storage apparatus is employed e.g. for analyzing a failure or malfunction of equipment, it can be assumed that occurrence of a failure or malfunction in the equipment is set to a condition for generating the above-mentioned trigger. In general, in analysis of a failure or malfunction of equipment, measurement data input and recorded after occurrence of the failure or malfunction is not very useful or effective, but measurement data recorded before the occurrence is very useful. Therefore, the measurement data stored before occurrence of the failure or malfunction is required to be recorded with a high density, i.e. frequently. However, the conventional data storage apparatus, in which before generation of the trigger, measurement data items are recorded in the thinned manner at a rate of one data item per five input data items, and only upon generation of the trigger, three consecutive measurement data items input immediately before the generation of the trigger are recorded, cannot provide the measurement data for analysis in an effective manner. Further, since measurement data items are continuously recorded once the trigger has been generated, if the storage capacity of the ring buffer memory is small, measurement data stored before the generation of the trigger can be lost. One possible solution to these problems is to store measurement data items at respective shorter sampling intervals and recording intervals before generation of a trigger. However, this solution makes it necessary to increase the storage capacity of the ring buffer memory, which results in an increase in costs. On the other hand, if measurement data items are recorded at regular and increased intervals before generation of a trigger, the density or frequency at which measurement data is recorded immediately before generation of the trigger becomes low.

SUMMARY OF THE INVENTION

It is an object of the invention to provide a data storage apparatus which is capable of storing effective data efficiently over a long term without increasing the storage capacity thereof.

To attain the above object, the present invention provides a data storage apparatus comprising:

sampling means for sampling data in a predetermined cycle;

storage means for storing a plurality of items of the data sampled by the sampling means; and updating means for updating the plurality of items of the data stored in the storage means to respective ones of the plurality of items of the data which were sampled at later times than times the plurality of items of the data were stored, in respective predetermined updating cycles which are longer as the plurality of items of the data were sampled at respective earlier times.

According to this data storage apparatus, data is sampled in the predetermined cycle, and a plurality of items of the data are stored in the storage means. The plurality of items of the data stored in the storage means are updated to respective ones of the plurality of items of the data which were sampled at later times than times the plurality of items of the data were stored, in respective predetermined updating cycles which are longer as the plurality of items of the data were sampled at respective earlier times. Therefore, the storage density of data or frequency at which data is stored is higher as the sampling time of the data is later, i.e. closer to the latest sampling time. In other words, the storage density of data is lower as the sampling time of the data is earlier than the latest sampling time. This makes it possible to store not only data indicating the latest state e.g. of a detected parameter in very great detail, but also data indicative of the general tendency of change in the detected parameter over a long term in the past. As a result, it is possible to store effective data efficiently over the long term without increasing the storage capacity of the storage means.

Preferably, the data storage apparatus further comprises inhibiting means for inhibiting the updating means from updating the plurality of items of the data when a predetermined update inhibiting condition is satisfied.

According to this preferred embodiment, when the predetermined update inhibiting condition is satisfied, updating of the plurality of items of the data is inhibited, so that data stored before the predetermined update inhibiting condition is satisfied can be preserved without being updated. Therefore, by setting occurrence of a failure or malfunction of equipment, for instance, as the predetermined update inhibiting condition, it is possible to properly obtain data indicative of a state of the equipment before occurrence of the malfunction which are stored in a manner effective for analysis of the malfunction.

Preferably, the predetermined updating cycles are set to respective values each obtained by multiplying a predetermined value by $2^n$, where n is an integer equal to or larger than zero.

According to this preferred embodiment, since each item of data can be updated in the updating cycle of $2^n \cdot Tcy$, it is possible to update the items of the data in the predetermined updating cycles with ease by a configuration effected by using software alone.

Preferably, the storage means comprises a plurality of storage areas associated with the predetermined updating cycles, respectively, and the updating means updates the plurality of items of the data stored in respective ones of the plurality of storage areas, to ones of the plurality of items of the data updated in shorter ones of the predetermined updating cycles, in the predetermined updating cycles, respectively.

Preferably, the storage means comprises a plurality of storage areas for storing latest ones of the plurality of items of the data which are updated in an updating cycle identical to the predetermined cycle in which the data is sampled.

Preferably, the storage means comprises a plurality of storage areas for storing earliest ones of the plurality of items of the data which are updated in a longest one of the predetermined updating cycles.

Preferably, the data comprises a plurality of kinds of data, and the storage means stores a plurality of items of each of the plurality of kinds of data.

The above and other objects, features, and advantages of the invention will become more apparent from the following detailed description taken in conjunction with the accompanying drawings.

BRIEF DESCRIPTION OF THE DRAWINGS

FIG. 1 is a block diagram schematically showing the arrangement of a data storage apparatus according to an embodiment of the invention;

DETAILED DESCRIPTION OF A PREFERRED EMBODIMENT

The invention will now be described in detail with reference to the drawings showing a preferred embodiment thereof. Referring first to FIG. 1, there is schematically shown the arrangement of a data storage apparatus according to an embodiment of the present invention. The data storage apparatus 1 is used for analyzing a malfunction condition which has occurred in the engine or power system of a vehicle, none of which are shown.

As shown in the figure, the data storage apparatus 1 is formed by an ECU 2 (sampling means, storage means, updating means, inhibiting means), which is implemented by a microcomputer including a CPU 3, a RAM 4 (storage means), a ROM 5, and an input interface 6. Connected to the input interface 6 are a plurality of sensors 7 (only two of which are shown). The sensors 7 detect respective parameters (e.g. a rotational speed of an output shaft of an automatic transmission and the like) indicative of operating conditions of the engine and power system of the vehicle, and then output respective signals indicative of the sensed parameters.

The signals from the respective sensors 7 are each input to the CPU 3 after A/D conversion and waveform shaping by the input interface 6. As described in detail hereinafter, the CPU 3 stores the input signals as data items in the RAM 4 according to a control program read from the ROM 5, and at the same time updates a plurality of data items having already stored in the RAM 4, in respective predetermined updating cycles. The RAM 4 is formed by a buffer memory provided with a backup power source. The RAM 4 has the data stored therein initialized when an ignition switch, not shown, is turned on, and even after the ignition switch is turned off, the data is preserved until the ignition switch is turned on again.

Figure 2:
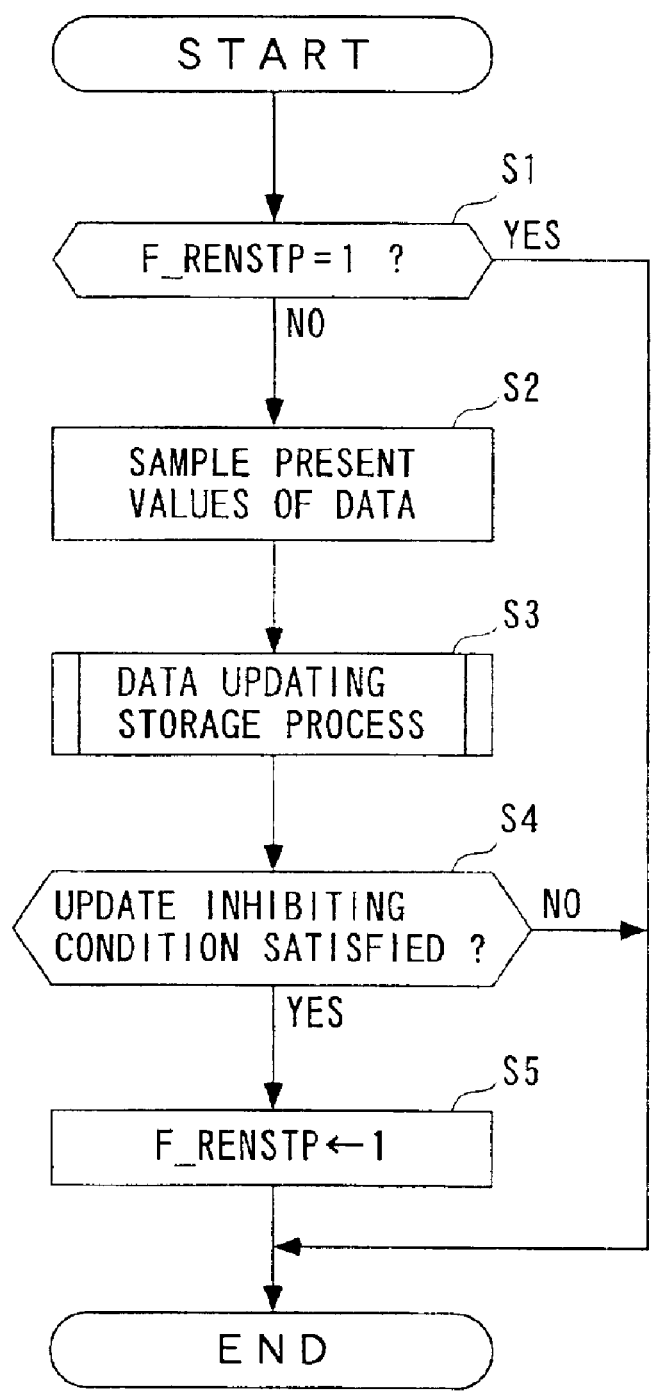
FIG. 2 is a flowchart showing a main routine for a data storage process.

In the following, a data storage process which is executed by the ECU 2 will be described. FIG. 2 shows a main routine of the data storage process. The process is executed in a predetermined cycle Tcy (e.g. 10 msec.).

First, it is determined in a step S1 whether or not an update inhibition flag F_RENSTP assumes 1. If the answer to the question is negative (NO), the program proceeds to a step S2, wherein the values of the signals from the respective sensors 7 are sampled as respective present values of data items.

Then, the program proceeds to a step S3, wherein a data updating storage process, described in detail hereinafter, is executed. Then, in the following step S4, it is determined whether or not a condition for inhibiting updating of the data is satisfied. In this step, when any of the present values of the sampled data items is not within a predetermined range of values, i.e. when it can be assumed that a malfunction has occurred in the engine or in the power system, it is determined that the condition for inhibiting the updating of the data is satisfied. If the answer to the question of the step S4 is negative (NO), it is judged that no malfunction has occurred in the engine or in the power system, and the program is immediately terminated.

On the other hand, if the answer to the question is affirmative (YES), it is judged that a malfunction has occurred in the engine or in the power system, and in the following step S5, the update inhibition flag F_RENSTP is set to 1 to indicate the fact, followed by terminating the program. As a result, the answer to the question of the step S1 in each of the following loops becomes affirmative "YES". In this case, since the data updating storage process in the step S3 is not carried out, the data items stored in the RAM 4 are preserved without being updated. Further, if the update inhibition flag F_RENSTP is set to 1, the ECU 2 executes an analysis process, not shown, for analyzing the malfunction condition of the engine or the power system based on the data items stored in the RAM 4.

Figure 3:
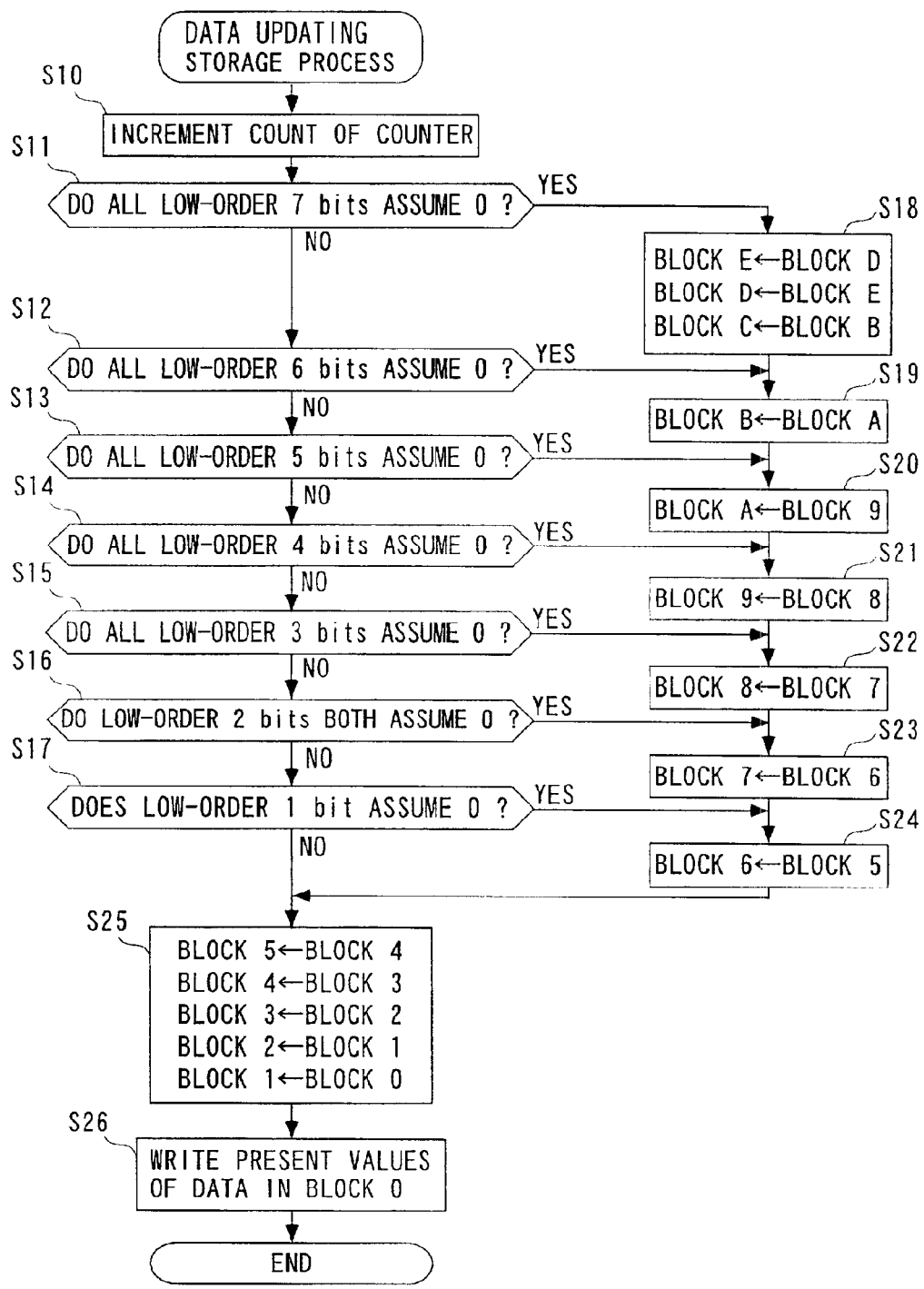
FIG. 3 is a flowchart showing a subroutine executed in a step of the FIG. 2 main routine, for a data updating storage process.

Next, the data updating storage process which is executed in the step S3 will be described in detail with reference to FIG. 3. In this process, first in a step S10, the count of a counter is incremented. More specifically, the count of the counter is incremented in the predetermined cycle Tcy. The count is represented by respective values of low-order 7 bits of 8-bit length data stored in a register of the CPU 3.

Then, in respective steps S11 to S17, it is sequentially determined whether or not all the values of each of respective sets ranging from the low-order 7 bits to the low-order 1 bit (least significant bit) are equal to "0".

More specifically, in a step S11, it is determined whether or not all the low-order 7 bits are equal to 0, in a step S12, whether or not all the low-order 6 bits are equal to 0, in a step S13, whether or not all the low-order 5 bits are equal to 0, in a step S14, whether or not all the low-order 4 bits are equal to 0, in a step S15, whether or not all the low-order 3 bits are equal to 0, in a step S16, whether or not all the low-order 2 bits are equal to 0, and in a step S17, whether or not the least significant bit is equal to 1.

Figure 4:
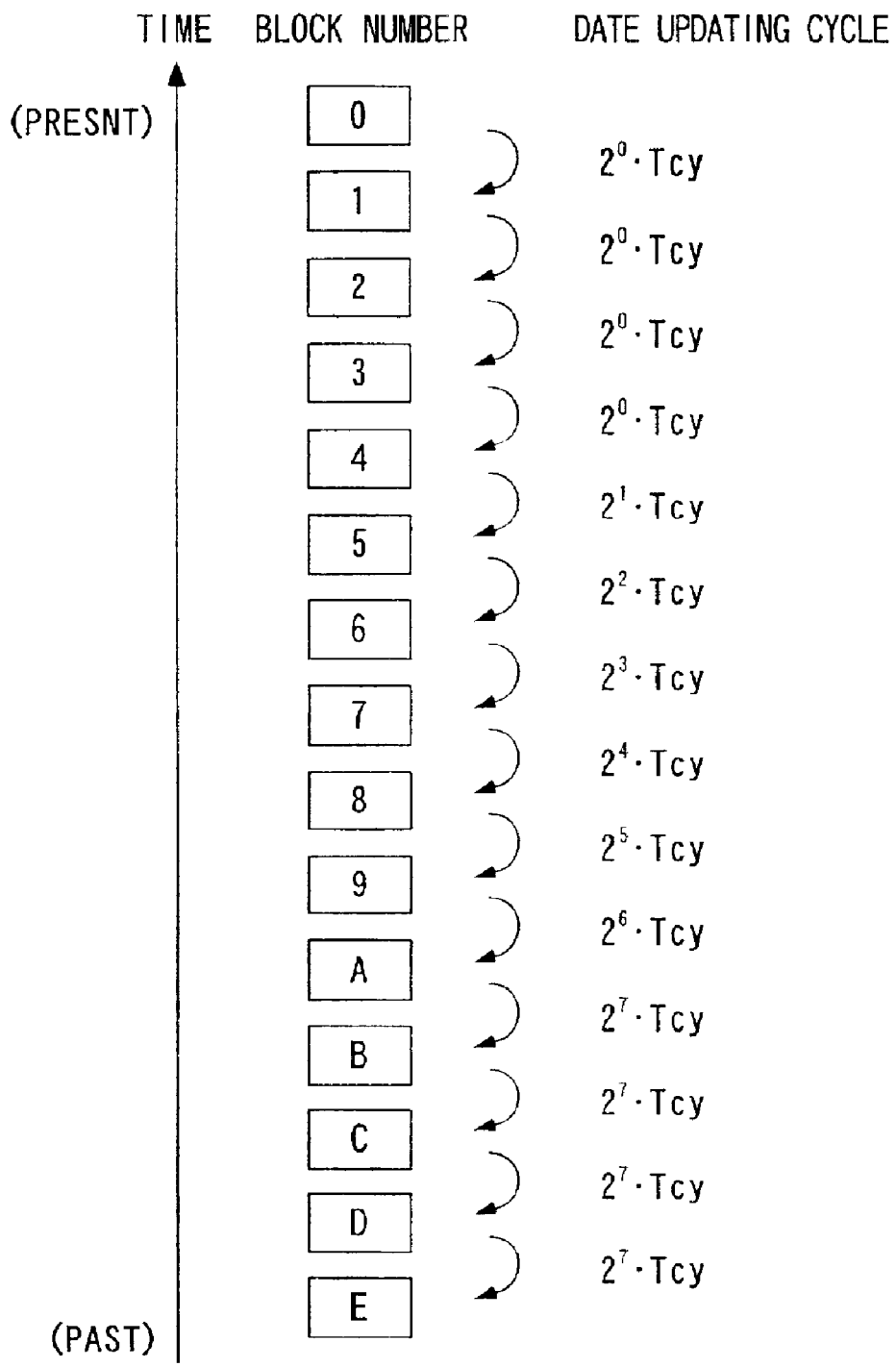
FIG. 4 is a diagram useful in explaining how data items are updated by the FIG. 3 process.

If the answers to the respective questions of the steps S11 to S17 are all negative (NO), the program proceeds to a step S25, wherein respective sets of data items stored in blocks 0 to 4 of the RAM 4 are written into blocks 1 to 5 of the same, respectively. This updates the respective sets of data items stored in the blocks 1 to 5 to the respective sets of data items stored in the blocks 0 to 4, whenever the present process is executed, i.e. in a predetermined updating cycle Tcy (=$2^0$·Tcy) (see FIG. 4).

Then, the program proceeds to a step S26, and the present values of the data items sampled in the step S2 are written into the block 0, followed by terminating the program.

On the other hand, if the answer to the question of the step S17 is affirmative (YES), i.e. if the low-order 1 bit (least significant bit) of the counter assumes 0, the program proceeds to a step S24, wherein a set of data items stored in the block 5 are written into the block 6. The count of the counter is incremented in the step S10, whenever the present process is executed, as described above, and hence the low-order n bits of the count are all 0 whenever the present process is executed $2^n$ times. Accordingly, the data items stored in the block 6 is updated to the data items stored in the block 5, in an updating cycle of $2^1$·Tcy (see FIG. 4). Then, the steps S25 and S26 are executed as described above, followed by terminating the program.

If the answer to the question of the step S16 is affirmative (YES), i.e. if the low-order 2 bits of the counter are all 0, the program proceeds to a step S23, wherein a set of data items stored in the block 6 are written into the block 7. This updates the data items stored in the block 7 to the data items stored in the block 6, in an updating cycle of $2^2$·Tcy for the reason described above (see FIG. 4). Then, the steps S24 to S26 are executed as described above, followed by terminating the program.

If the answer to the question of the step S15 is affirmative (YES), i.e. if the low-order 3 bits of the counter are all 0, the program proceeds to a step S22, wherein a set of data items stored in the block 7 are written into the block 8. This updates the data items stored in the block 8 to the data items stored in the block 7, in an updating cycle of $2^3$·Tcy for the reason described above (see FIG. 4). Then, the steps S23 to S26 are executed as described above, followed by terminating the program.

If the answer to the question of the step S14 is affirmative (YES), i.e. if the low-order 4 bits of the counter are all 0, the program proceeds to a step S21, wherein a set of data items stored in the block 8 are written into the block 9. This updates the data items stored in the block 9 to the data items stored in the block 8, in an updating cycle of $2^4$·Tcy for the reason described above (see FIG. 4). Then, the steps S22 to S26 are executed as described above, followed by terminating the program.

If the answer to the question of the step S13 is affirmative (YES), i.e. if the low-order 5 bits of the counter are all 0, the program proceeds to a step S20, wherein a set of data items stored in the block 9 are written into a block A. This updates the data items stored in the block A to the data items stored in the block 9, in an updating cycle of $2^5$·Tcy for the reason described above (see FIG. 4). Then, the steps S21 to S26 are executed as described above, followed by terminating the program.

If the answer to the question of the step S12 is affirmative (YES), i.e. if the low-order 6 bits of the counter are all 0, the program proceeds to a step S19, wherein a set of data items stored in the block A are written into a block B. This updates the data items stored in the block B to the data items stored in the block A, in an updating cycle of $2^6$·Tcy for the reason described above (see FIG. 4). Then, the steps S20 to S26 are executed as described above, followed by terminating the program.

If the answer to the question of the step S11 is affirmative (YES), i.e. if the low-order 7 bits of the counter are all 0, the program proceeds to a step S18, wherein respective sets of data items stored in the block B to a block D are written into the block C to a block E, respectively. This updates the respective sets of data items stored in the blocks C to E to the respective sets of data items stored in the blocks B to D, in a predetermined updating cycle of $2^7$·Tcy for the reason (see FIG. 4) described above. Then, the steps S19 to S26 are executed as described above, followed by terminating the program.

As described above, according to the data storage apparatus 1 of the present embodiment, the respective sets of data items stored in the blocks 0 to 5 are each updated in the updating cycle of $2^0$·Tcy, and the respective sets of data items stored in the blocks 6 to 9, A and B are updated in the respective updating cycles of $2^1$·Tcy to $2^6$·Tcy. Further, the respective sets of data items stored in the blocks C to E are each updated in the updating cycle of $2^7$·Tcy (see FIG. 4). Thus, the data updating cycles for the blocks are set such that they are longer as the sets of data items stored in the block were sampled at respective earlier times. Therefore, the storage density of data or frequency at which data is stored is higher as the sampling time of the data is later, i.e. closer to the latest sampling time. In other words, the storage density of data is lower as the sampling time of the data is earlier than the latest sampling time. This setting makes it possible to store not only data indicating the latest state of the detected parameter in very great detail, but also data indicative of the general tendency of change in the detected parameter over a long term in the past. As a result, it is possible to store effective data efficiently over the long term without increasing the storage capacity of the RAM 4.

Further, when the condition for inhibiting updating of the data is satisfied, i.e. when a malfunction occurs in the engine or in the power system, updating of data items stored in each block is inhibited, so that the data items in the RAM 4 are preserved without being updated. As a result, it is possible to efficiently obtain data which were sampled before occurrence of the malfunction and hence useful or effective for analysis of the malfunction, as described above. Moreover, the updating of data according to the updating cycle of $2^n$·Tcy can be performed with ease through a configuration effected by using software alone.

Although in the above embodiment, the sampling cycle in which data items are sampled and the updating cycle in which respective sets of data items stored in the blocks 0 to 5 are updated are set to the identical value, this is not limitative, but they may be set to different values. Further, the application of the data storage apparatus 1 of the present invention is not limited to the above embodiment for analysis of a malfunction of the vehicle, but the apparatus 1 can be applied to a use which necessitates later or newer data to be stored more densely, and earlier or older data to be stored more non-densely. Furthermore, the updating cycles in which stored data items are updated or recording densities with which data items are recorded or stored are not limited to those given in the embodiment by way of example, but they can be set, as desired, by software.

It is further understood by those skilled in the art that the foregoing is a preferred embodiment of the invention, and that various changes and modifications may be made without departing from the spirit and scope thereof.

What is claimed is:

1. A data storage apparatus comprising:

sampling means for sampling data in a predetermined cycle storage means for storing a plurality of items of the data sampled by said sampling means;

updating means for updating the plurality of items of the data stored in said storage means to respective ones of the plurality of items of the data, which were sampled at later times than the plurality of items of the data were stored, in respective predetermined updating cycles which are shorter than the updating cycles of the plurality of items of the data which were sampled at respective earlier times; and inhibiting means for inhibiting said updating means from updating the plurality of items of the data when a predetermined update inhibiting condition is satisfied.

2. A data storage apparatus according to claim 1, wherein the predetermined updating cycles are set to respective values each obtained by multiplying a predetermined value by $2^n$, where n is an integer equal to or larger than zero.

3. A data storage apparatus according to claim 1, wherein the predetermined updating cycles are set to respective values each obtained by multiplying a predetermined value by $2^n$, where in is an integer equal to or larger than zero.

4. A data storage apparatus according to claim 1, wherein said storage means comprises a plurality of storage areas for storing latest ones of the plurality of items of the data which are updated in an updating cycle identical to the predetermined cycle in which the data is sampled.

5. A data storage apparatus according to claim 1, wherein said storage means comprises a plurality of storage areas for storing earliest ones of the plurality of items of the data which are updated in a longest one of the predetermined updating cycles.

6. A data storage apparatus according to claim 1, wherein the data comprises a plurality of kinds of data, and wherein said storage means stores a plurality of items of each of the plurality of kinds of data.

7. A data storage apparatus comprising:

sampling means for sampling data in a predetermined cycle storage means for storing a plurality of items of the data sampled by said sampling means; and updating means for updating the plurality of items of the data stored in said storage means to respective ones of the plurality of items of the data, which were sampled at later times than the plurality of items of the data were stored, in respective predetermined updating cycles which are shorter than the updating cycles of the plurality of items of the data which were sampled at respective earlier times, wherein the predetermined updating cycles are set to respective values each obtained by multiplying a predetermined value by $2^n$, where n is an integer equal to or larger than zero.

8. A data storage apparatus according to claim 7, wherein said storage means comprises a plurality of storage areas for storing earliest ones of the plurality of items of the data which are updated in a longest one of the predetermined updating cycles.

9. A data storage apparatus according to claim 7, wherein the data comprises a plurality of kinds of data, and wherein said storage means stores a plurality of items of each of the plurality of kinds of data.

10. A data storage apparatus comprising:

sampling means for sampling data in a predetermined cycle storage means for storing a plurality of items of the data sampled by said sampling means; and updating means for updating the plurality of items of the data stored in said storage means to respective ones of the plurality of items of the data, which were sampled at later times than the plurality of items of the data were stored, in respective predetermined updating cycles which are shorter than the updating cycles of the plurality of items of the data which were sampled at respective earlier times, wherein said storage means comprises a plurality of storage areas for storing latest ones of the plurality of items of the data which are updated in an updating cycle identical to the predetermined cycle in which the data is sampled.

11. A data storage apparatus according to claim 10, wherein said storage means comprises a plurality of storage areas for storing earliest ones of the plurality of items of the data which are updated in a longest one of the predetermined updating cycles.

12. A data storage apparatus according to claim 10, wherein the data comprises a plurality of kinds of data, and wherein said storage means stores a plurality of items of each of the plurality of kinds of data.

* * * * *